(12) United States Patent
Lieberman

(10) Patent No.: US 10,337,751 B2
(45) Date of Patent: Jul. 2, 2019

(54) LIQUEFIED PETROLEUM GAS SOLVENT EXTRACTION ROOM VENTILATION SYSTEM AND METHODS

(71) Applicant: Environmental Information Services, Inc., Boulder, CO (US)

(72) Inventor: James L. Lieberman, Boulder, CO (US)

(*) Notice: Subject to any disclaimer, the term of this patent is extended or adjusted under 35 U.S.C. 154(b) by 0 days.

(21) Appl. No.: 15/592,794

(22) Filed: May 11, 2017

(65) Prior Publication Data

US 2018/0038605 A1 Feb. 8, 2018

Related U.S. Application Data

(60) Provisional application No. 62/370,722, filed on Aug. 4, 2016.

(51) Int. Cl.

| F24F 11/00 | (2018.01) |
| F24F 7/06 | (2006.01) |
| F24F 11/77 | (2018.01) |
| F24F 11/30 | (2018.01) |
| B08B 15/00 | (2006.01) |
| B08B 15/02 | (2006.01) |
| F24F 110/50 | (2018.01) |
| F24F 11/35 | (2018.01) |

(52) U.S. Cl.
CPC .............. *F24F 7/06* (2013.01); *B08B 15/00* (2013.01); *B08B 15/02* (2013.01); *F24F 11/0001* (2013.01); *F24F 11/30* (2018.01); *F24F 11/77* (2018.01); *B08B 2215/003* (2013.01); *F24F 11/35* (2018.01); *F24F 2011/0005* (2013.01); *F24F 2110/50* (2018.01)

(58) Field of Classification Search
CPC .. F24F 7/06; F24F 7/10; F24F 11/0079; F24F 3/1607; F24F 3/161; B05B 16/60; B05B 16/00
USPC ................. 454/187, 238, 49–55; 431/22
See application file for complete search history.

(56) References Cited

U.S. PATENT DOCUMENTS

| 3,986,850 A * | 10/1976 | Wilcox | E04B 9/02 137/246 |
| 4,267,769 A * | 5/1981 | Davis | A61L 9/16 454/187 |
| 4,667,580 A * | 5/1987 | Wetzel | F24F 3/161 165/108 |
| 4,747,341 A * | 5/1988 | Hedrick | F24F 3/161 454/187 |

(Continued)

*Primary Examiner* — Vivek K Shirsat
(74) *Attorney, Agent, or Firm* — Will Hunziker

(57) ABSTRACT

The extraction room and ventilation system comprises an extraction room involving opposing supply and exhaust systems that provide a laminar type air flow configured to transmit fresh air flow to said extraction room at a rate of more than 1000 cubic feet per minute at a static pressure of more than 0.5 inch water. The extraction room is configured to use intrinsically safe or Class 1 Division 1, group D electrical appliances; a flammable gas detector, with an alarm and automatic ventilation system connected to said flammable gas detector; and be constructed in accordance with the International Fire Code & International Building Code definition for a One Hour Fire Rated Room construction. In another embodiment the ventilation system may be prefabricated or installed in a standardized movable unit such as a trailer or shipping container.

13 Claims, 8 Drawing Sheets

(56) References Cited

U.S. PATENT DOCUMENTS

| | | | | |
|---|---|---|---|---|
| 4,781,108 A * | 11/1988 | Nillson | A61G 10/02 | 128/897 |
| 4,801,312 A * | 1/1989 | Mateson | F24F 3/1607 | 454/192 |
| 4,804,392 A * | 2/1989 | Spengler | B01L 1/04 | 454/187 |
| 5,073,204 A * | 12/1991 | Herwander | B08B 15/026 | 134/21 |
| 5,256,105 A * | 10/1993 | Austin | F24F 3/161 | 454/187 |
| 5,259,812 A * | 11/1993 | Kleinsek | B01L 1/04 | 312/1 |
| 5,643,077 A * | 7/1997 | Ayer | B05B 15/1222 | 454/229 |
| 5,704,833 A * | 1/1998 | Reix | F24F 3/161 | 454/187 |
| 5,820,456 A * | 10/1998 | Nelson | B05B 15/1222 | 454/238 |
| 6,080,060 A * | 6/2000 | Larsson | F24F 3/161 | 454/187 |
| 6,186,891 B1 * | 2/2001 | D'Andrea | F24F 3/161 | 454/187 |
| 6,383,241 B1 * | 5/2002 | Janus | B01D 46/0002 | 454/187 |
| 6,482,083 B1 * | 11/2002 | Nilsson | A61G 10/02 | 454/187 |
| 6,607,435 B2 * | 8/2003 | Yokoyama | F24F 3/161 | 454/187 |
| 6,821,346 B2 * | 11/2004 | Ainsworth | B05B 15/1211 | 118/326 |
| 6,896,712 B2 * | 5/2005 | Ryan | B01L 1/50 | 454/187 |
| 7,044,851 B2 * | 5/2006 | Peterson | F24F 3/16 | 454/187 |
| 7,083,515 B2 * | 8/2006 | Rapisarda | E04B 1/98 | 454/187 |
| 7,195,672 B2 * | 3/2007 | Ghilardi | B05B 15/1214 | 118/326 |
| 7,335,243 B2 * | 2/2008 | Homan | A61G 10/023 | 128/205.11 |
| 8,308,536 B2 * | 11/2012 | Kristensson | A61G 13/108 | 454/187 |
| 2002/0108334 A1 * | 8/2002 | Rapisarda | E04B 5/43 | 52/302.1 |
| 2003/0121417 A1 * | 7/2003 | Lederer | H01L 21/67017 | 95/273 |
| 2004/0080424 A1 * | 4/2004 | Perry | G08B 21/16 | 340/632 |
| 2007/0190922 A1 * | 8/2007 | Fuchs | B01L 1/02 | 454/187 |
| 2009/0253360 A1 * | 10/2009 | Tafoya | B05B 15/1222 | 454/50 |
| 2011/0053486 A1 * | 3/2011 | Holtz | C12M 37/00 | 454/187 |
| 2012/0115409 A1 * | 5/2012 | Kelpentidjian | F24F 3/16 | 454/270 |
| 2014/0179216 A1 * | 6/2014 | Walters | F24F 3/161 | 454/187 |
| 2016/0097553 A1 * | 4/2016 | Brian | F24F 13/14 | 454/255 |

* cited by examiner

LIQUEFIED PETROLEUM GAS SOLVENT EXTRACTION ROOM VENTILATION SYSTEM AND METHODS

CROSS-REFERENCE TO RELATED APPLICATION

This document is a nonprovisional application claiming the benefit of, and priority to, U.S. Provisional Patent Application Ser. No. 62/370,722, entitled "BUTANE CANNABIS EXTRACTION ROOM VENTILATION & DESIGN," filed on Aug. 4, 2016, hereby incorporated by reference in its entirety.

BACKGROUND

In the related art, solvents, small hydrocarbon molecules (C3 to C7) or liquefied petroleum gas solvent extraction, such as cannabis or cannabinoid extraction may be performed with n-butane, iso-butane, propane, or other hydrocarbon or a mixtures of liquefied petroleum gas compounds. The solvents, hydrocarbons, gas, or mixed gas compounds form colorless and flammable gases or vapors at room temperature. The hydrocarbons, liquefied gases, or mixed gas compounds are used as a fuel, a refrigerant, and an aerosol propellant in many industries. Some related art extraction machinery uses hydrocarbon or liquefied petroleum gas, such as heptane, hexane, butane, or propane, for extracting cannabinoid compounds from cannabis plant material. This type of hydrocarbon or liquefied petroleum gas solvent extraction is a widely used technique in the food and agriculture industries as well. Since the 1970s, several different liquefied petroleum gases and short chain hydrocarbon compounds have been used, e.g., from propane to hexane, in liquefied petroleum gas solvent extraction. These hydrocarbon and liquefied petroleum gases are typically volatile and potentially flammable. Thus, the related art has experienced challenges and concerns relating to residual hydrocarbon solvent in the food or agricultural product; as such, a need exists for improved ventilation for processing cannabis plant material.

SUMMARY

To address at least the challenges experienced in the related art, the present disclosure involves an extraction room ventilation system and methods for isolating volatiles, such as explosive gases and vapors from organic solvents, e.g., hydrocarbon or liquefied petroleum gases in general, butane and propane and gas mixtures, and the like, from extraction equipment; such as cannabinoid extraction equipment; from potential ignition sources, providing sufficient ventilation to maintain the expected (compliant) concentration of gases within the extraction room in a range of approximately 25% and less of the lower explosive limit, e.g., as defined by fire compliance codes and standards, and providing ventilation for, and facilitating removal of, measurable (or residual) absorbed flammable gases from spent plant material and cannabinoid extract materials.

One embodiment of the ventilation system comprises an extraction room involving opposing supply and exhaust registers that provide a laminar type air flow configured to transmit fresh air flow to said extraction room at a rate of more than 1000 cubic feet per minute at a static pressure of more than 0.5 inch water. The extraction room is configured to use intrinsically safe or Class 1 Division 1, Group D electrical appliances; a flammable gas detector, with an alarm and automatic ventilation system connected to said flammable gas detector; and be constructed in accordance with the International Fire Code & International Building Code definition for a One Hour Fire Rated Room construction. In another embodiment the ventilation system may be prefabricated or installed in a standardized movable unit such as a trailer or shipping container.

BRIEF DESCRIPTION OF THE DRAWINGS

Various embodiments are described herein with reference to the several figures of the Drawings. Certain aspects of the Drawings are depicted in a simplified way for reason of clarity. Not all alternatives and options are shown in the several figures of the Drawings; and, therefore, the Claims are not limited in scope to the content of the several figures of the Drawings.

1. The Several Figures

Figure 1:
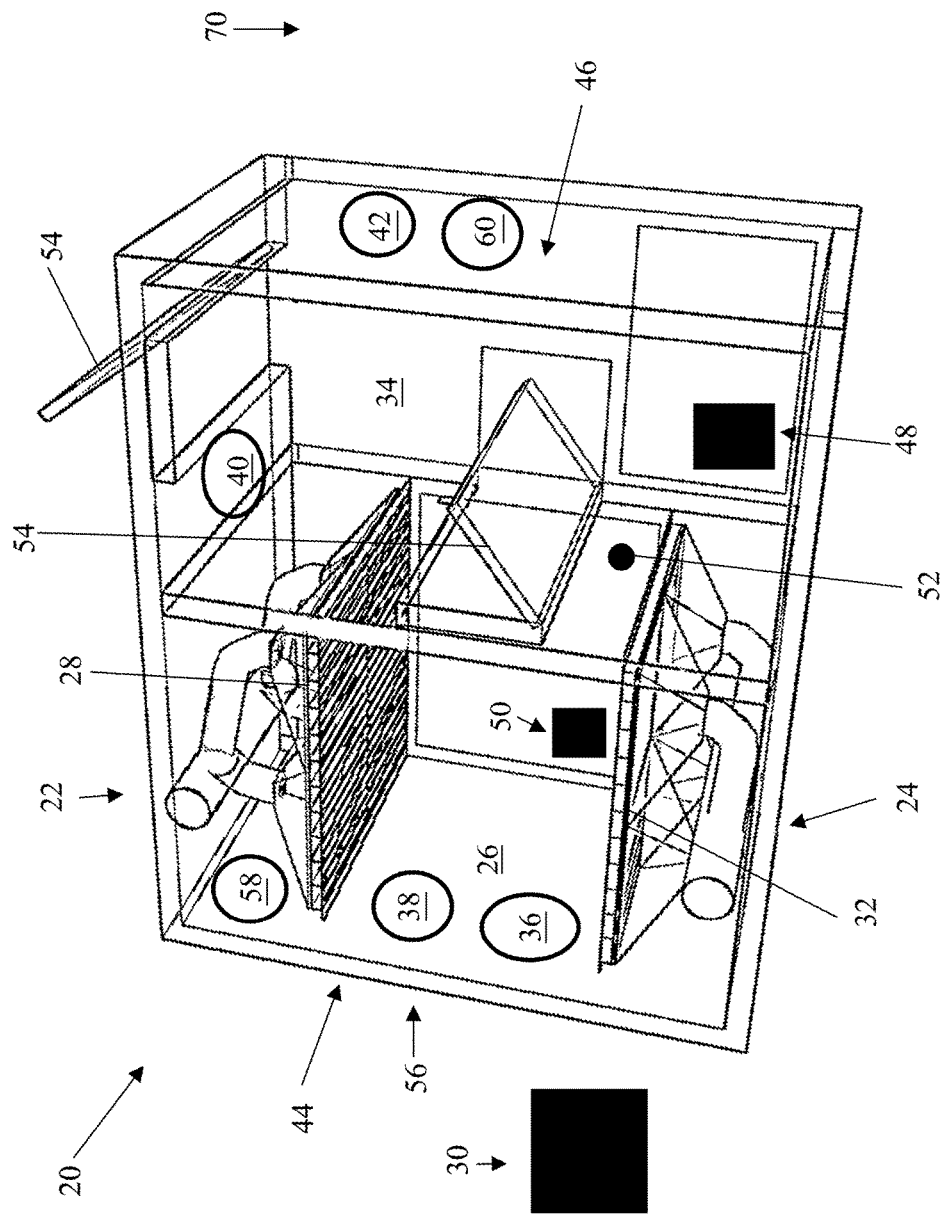
FIG. 1 is an illustration of a perspective view of an extraction room ventilation system, in accordance with an alternative embodiment of the present disclosure.

Corresponding reference characters indicate corresponding elements, components, or features throughout the several figures of the Drawing. Elements in the several figures are illustrated for simplicity and clarity and have not necessarily been drawn to scale. For example, the dimensions of some elements in the several figures may be emphasized relative to other elements for facilitating understanding of the various presently disclosed embodiments. Also, common, but well-understood, elements that are useful, or necessary, in commercially feasible embodiments are often not depicted in order to facilitate a less obstructed view of such embodiments of the present disclosure.

2. Element References

20 Extraction Room Ventilation System
22 Supply Air System
24 Exhaust Air System
26 Extraction Room
28 Supply Air Register 30 Fan, Blower, or HVAC System
32 Exhaust Air Register
34 Anteroom
36 Explosion Proof Lighting
38 Flammable Gas Detector
40 Switches
42 Electrical Outlets
44 Walls
46 Floor
48 Ancillary Equipment
50 Extraction Equipment
52 Sealed Metal Pipe
54 Door
56 Ceiling
58 Fire Suppression System
60 Alarm
62 Air Register
64 Panel(s)
66 Slot(s)
68 Standard Shipping Container, Trailer, Semi-Trailer, Or Other Standard Movable Unit
70 Exterior Space

DETAILED DESCRIPTION

The following description is not to be taken in a limiting sense, but is made merely for the purpose of describing the general principles of exemplary embodiments; and many additional embodiments of the present disclosure are possible. Understood is that no limitation in the scope of the present disclosure is thereby intended. The scope of the present disclosure is determined with reference to the Claims. References throughout this specification to "one embodiment," "an embodiment," or similar language denotes that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

Further, the described features, structures, or characteristics of the present disclosure may be combined in any suitable manner in one or more embodiments. In the Detailed Description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure. Any alterations and further modifications in the illustrated devices, and such further application of the principles of the present disclosure, as illustrated herein, are contemplated as would normally occur to one skilled in the art to which the present disclosure relates and are also encompassed by the present disclosure.

Unless otherwise indicated, the Drawing is intended to be read, e.g., arrangement of parts, proportion, degree, etc., together with the Specification, and are to be considered a portion of the entire written description of this disclosure. As used in the following description, the terms "horizontal," "vertical," "left," "right," "up," and "down," as well as adjectival and adverbial derivatives thereof, e.g., "horizontally," "vertically," "rightwardly," "upwardly," etc., simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate. Also, as used herein, terms such as "positioned on" or "supported on" denote positioned or supported on but not necessarily in direct contact with the surface.

The phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" denotes A alone, B alone, C alone, A and B together, A and C together, B and C together, or A, B and C together. The terms "a" or "an" entity refers to one or more of that entity. As such, the terms "a," "an", "one or more," and "at least one" can be used interchangeably herein. Also noted is that the terms "comprising," "including," and "having" can be used interchangeably.

Further, all numbers expressing dimensions, physical characteristics, and so forth, used in the specification and claims are to be understood as being modified in all instances by the term "about." Accordingly, unless indicated to the contrary, the numerical values set forth in the following specification and claims can vary depending upon the desired properties sought to be obtained by the practice of the subject matter of the present disclosure.

For the purposes of promoting an understanding of the principles of the present disclosure, reference will now be made to the embodiments illustrated in the drawings and specific language will be used to describe the same.

Figure 2:
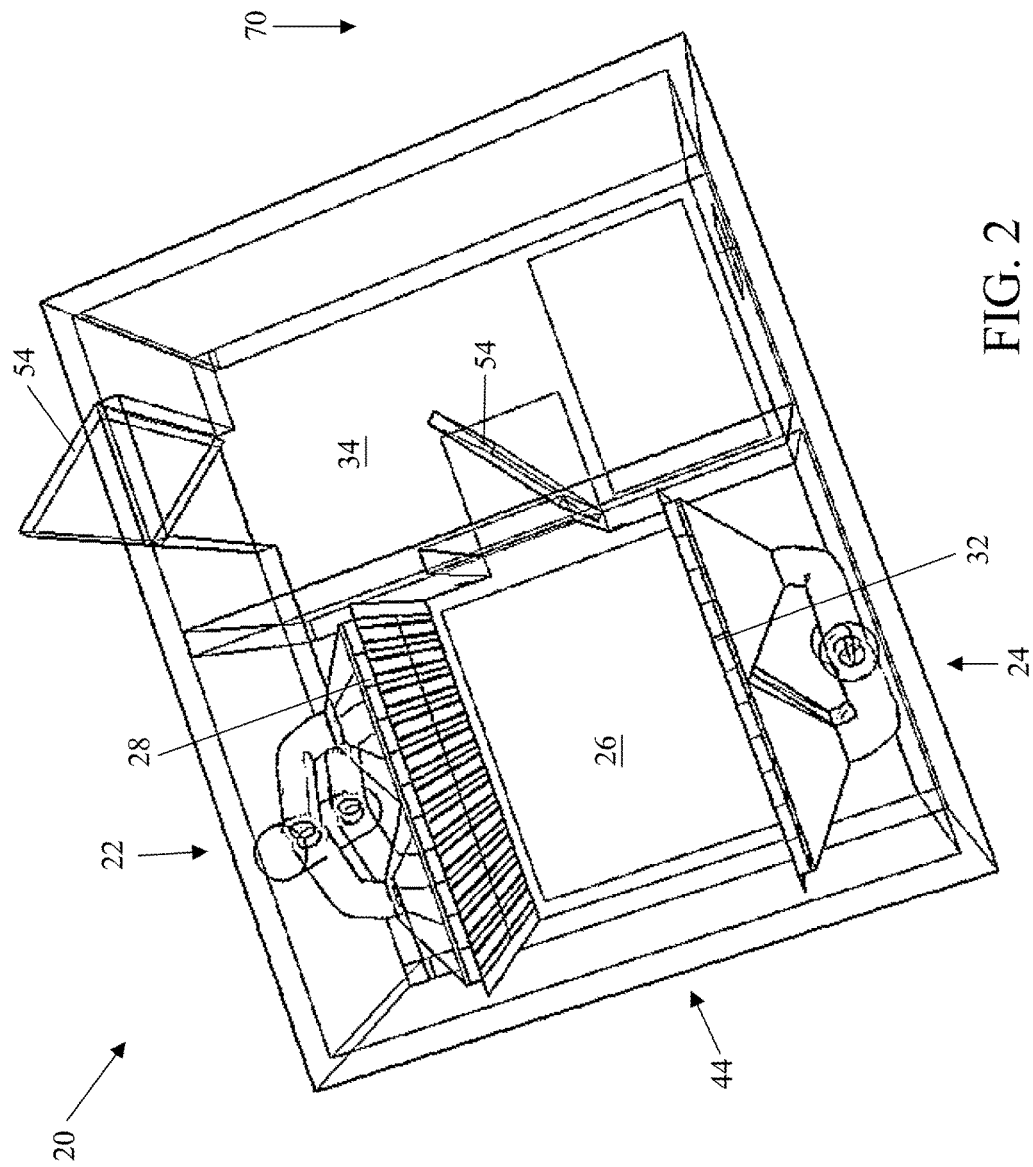
FIG. 2 is an illustration of a top view of an extraction room ventilation system as shown in FIG. 1, in accordance with an alternative embodiment of the present disclosure.

Referring to FIGS. 1 and 2, these diagrams illustrate a frontal perspective view and a top view respectively of an embodiment of a hydrocarbon or liquefied petroleum gas (LPG) solvent extraction room ventilation system 20, in accordance with an embodiment of the present disclosure. The system 20 comprises a pair of complementary handling systems, the complementary handling systems comprising a supply air system 22 and an exhaust air system 24. The actual size of the ventilated working area between the supply air system 22 and the exhaust air system 24 may be any dimension. The system 20 also comprises an extraction room 26. The supply air system 22 comprises at least one supply air register 28 through which air can pass and a fan, blower, or HVAC system 30 to move the air through the supply air register 28. The exhaust air system 24 comprises at least one exhaust air register 32 through which air can pass and a fan, blower, or HVAC system 30 to move the air through the exhaust air register 32.

Still referring to FIGS. 1 and 2 together, the extraction room 26 may be of any dimensions by preferentially comprise a length in a range of approximately 10 feet to 14 feet, and width in a range of approximately 8 feet to approximately 14 feet, and a ceiling height in a range of approximately 7.5 feet to approximately 10 feet. In this embodiment the supply air register and exhaust air register 32 each span the entire length of two opposing walls of the extraction room 26. Preferentially, the extraction room 26 is ventilated using a volumetric flow rate of more than 1000 cubic feet per minute (CFM); preferably 1,200 CFM; with the pair of complementary handling systems configured to produce a laminar type flow of air movement in the extraction room 26. In the preferential embodiment, the maximum flammable compressed gas within the extraction room 26 should be less than the IFC/IBC allowable limit of approximately 150 pounds of liquefied gas or approximately 480 gallons of class IB flammable liquid. In the preferred embodiment, the extraction room 26 is compliant as an "F" occupancy area. The preferred embodiment is intended to be sufficient to meet the International Fire Code & International Building Code definition for a One Hour Fire Rated Room and all electrical appliances and connections are intended to be configured to meet the National Electric Code (NEC) Class I, Division 1, Group D requirements. Essentially, all vapors and gases are vented from the room; and all possible causes of electrical sparks are reduced to prevent fire or explosion of flammable gases.

A One Hour Fire Rated Room as defined in this patent and the claims below comprise the following elements: it is constructed of fire resistant materials such, but not limited to: walls made from gypsum board and insulation made from mineral fiber or mineral wood; wherein continuity between fire resistant floor, wall, and roof fire resistance rated material is maintained; and, air transfer ducts and opening are designed to close automatically if smoke is detected.

Still referring to FIGS. 1 and 2, the system 20 comprises an extraction room 26, and possibly an anteroom 34, wherein the anteroom 34 which may adjoin the extraction room 26. The extraction room 26 contains no electrical equipment, except for one or more of the following components: explosion proof lighting 36, a flammable gas detector 38, and other intrinsically safe or Class 1 Division 1, group D electrical appliances. In another embodiment, switches 40 to activate lights and/or the extraction room ventilation system 20 in the extraction room 26 are located outside of the extraction room 26, possibly in the anteroom 34 or on the exterior of the anteroom adjacent to the entrance door. In a preferred embodiment, explosion proof lighting 36 provides approximately 960 to 1,290 lux (lumens per square meter) of light within the extraction room 26. In another embodiment, electrical outlets for small electrically powered equipment 42 may be located within the anteroom 34 on either side of a pathway for ingress and egress. In another embodiment, the walls 44 of the extraction room 26 are smooth and painted with a washable paint or other washable surface. In another embodiment, the floors 46 are sealed with an ante-static epoxy coating or a resilient vinyl laminate material.

In another embodiment, ancillary equipment 48 for supporting the extraction equipment 50 is disposable in the anteroom 34. Ancillary equipment 48 may include, but is not limited to, chillers, sensors, computer systems, security cameras, and other support equipment. Communication between the anteroom 34 and the extraction room 26 could be performed through sealed metal pipes 52 inserted through their connecting wall 44.

Still referring to FIGS. 1 and 2, in another embodiment, the anteroom 24 may comprises a one-hour IFC/IBC room construction; preferably having an approximately ⅝-inch sheet rock material on metal studs (for fixed location construction) or a unitized construction with walls of an approximately ⅝-inch DensGlass. Preferably, the anteroom 34 also comprises a finish that is a smooth cleanable surface. In a preferred embodiment, the anteroom 34 comprises a minimum size of approximately 5 feet wide by approximately 10 feet long by approximately 7.5 feet high, and a maximum size of approximately 8 feet wide by approximately 14 feet long by approximately 10 feet high. The anteroom 34 may further comprises a door 54 to the outside for emergency ingress or egress. In a preferred embodiment, the switches for both the anteroom 34 and extraction room 26 are located on the exterior of the anteroom 34, as are major electrical connections and disconnect boxes. The anteroom 34 and extraction room 26 may also comprise a one-hour IFC/IBC room construction; preferably having an approximately ⅝-inch DensGlass on metal studs (for fixed location construction) or unitized construction with walls with a IBC 1 hour construction. In this embodiment, the extraction room 26 and anteroom 34 both comprise an NEC Classification of Class 1, Division I, Group D rating; and both may comprises a finish that is a smooth cleanable surface; and a floor 46 comprising antistatic epoxy coating or resilient vinyl type flooring.

Still referring to FIGS. 1 and 2, in this embodiment, the extraction room 26 preferably experiences approximately 50 to approximately 60 or more air changes per hour. Exhaust from the extraction room 26 may be transmitted via the exhaust air register 32 with a minimum flow rate of more than 1,000 CFM at a static pressure of more than 1 inch of water. If so, the extraction room 26 will be compliant as an NEC classified area, with a rating of Class I, Division 1, Group D. The extraction room 26 may also comprises lighting of Class I Division I and Group D Electrical connections for small intrinsically safe equipment. The ceiling 56 of the extraction room 26 may fitted with a fire suppression system 58 which may be compliant with NFPA 13, IFC & IBC guidance, either a conventional water drench type or a dry exhaust system, for added safety.

Still referring to FIGS. 1 and 2, a determination of weight to be supported by the ceiling 56 is calculated based on the equipment that may be mounted on it. In a preferred embodiment, the following equipment may be included: a HVAC makeup air unit and a 25 to 45 CFM 125 psi air compressor unit. Sufficient load bearing members may be added to the exterior walls of the extraction room 26 and ceiling 56 to support 150% of the calculated load.

Still referring to FIGS. 1 and 2, in another embodiment, a flammable gas detector 38 may be powered whenever flammable gas is present in the extraction room 26, a wire cage may surround the fixed flammable gas detector 38 to protect the fixed flammable gas detector 38 from impact damage. The fixed flammable gas detector 38 maybe continuously operated after the extraction room 26 is commissioned and may be checked and calibrated at intervals of not more than approximately six months to ensure correct operation. The fixed flammable gas detector 38 may comply with NEC Class I, Division 1 requirements. The fixed flammable gas detector 38 may also comprise a display screen that is mounted in the anteroom 34 and provides a reading in percent LEL (lowest explosive limit capable of starting a fire). The fixed flammable gas detector 38 may be connected to an alarm 60, such as at least one of an audible alarm or a visual alarm, e.g., an alarm light horn and a strobe light, so that, if approximately 25% or greater than the LEL is sensed, the alarm 60 is activated. The fixed flammable gas detector 38 is interconnected with the exhaust air system 24 and/or the supply air system 22 so that, if approximately 25% of the LEL or more is sensed, one or both of the systems are powered or activated into a condition wherein they cannot be depowered. The alarm 60 may be compliant with NEC Class 1, Division I, Group D requirements or exempt.

Still referring to FIGS. 1 and 2, in an embodiment, the switch 40 that actuates the lights for the anteroom 34 and extraction room 26 may also activate one or both of the air supply or exhaust systems. The exhaust fan, blower, or HVAC system 30 may comply with NEC Class 1, Div. I, Group D requirements and have a minimum flow rate of more than 1,080; with preferably 1,200 or more CFM at a static pressure of more than 1 inch water. The air entering the extraction room 26 and the anteroom 34 may be reheated or cooled.

Still referring to FIGS. 1 and 2, an embodiment of a Liquefied Petroleum Gas (LPG) extraction room's ventilation system 20 may be designed to create a laminar flow environment in the extraction room 26; by employing vertically slotted air registers 62, appropriate face velocity and volumetric flow rate, and a push-pull principle. The system can create 100% fresh air for makeup and one-pass exhaust with air coming from either the anteroom 34 or an exterior space 70 and flowing through the extraction room 26 and to the exterior space 70.

Figure 3:
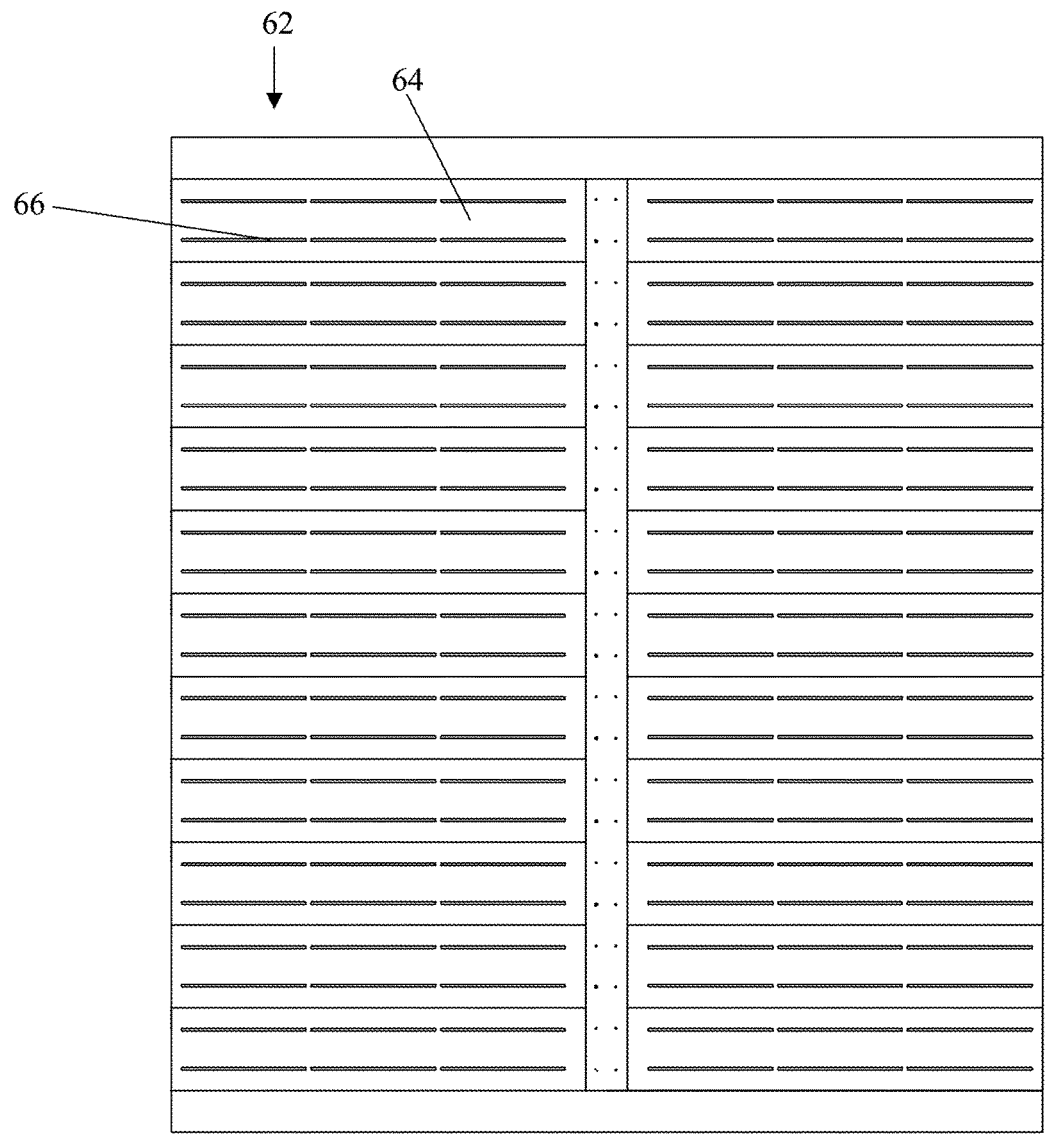
FIG. 3 is an illustration of a front view of an air register, in accordance with an embodiment of the present disclosure.
Figure 4:
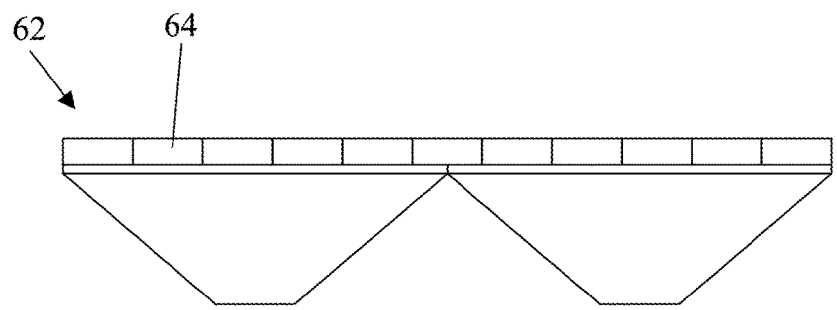
FIG. 4 is an illustration of a top view of the air register pictured in FIG. 3, in accordance with an embodiment of the present disclosure.
Figure 5:
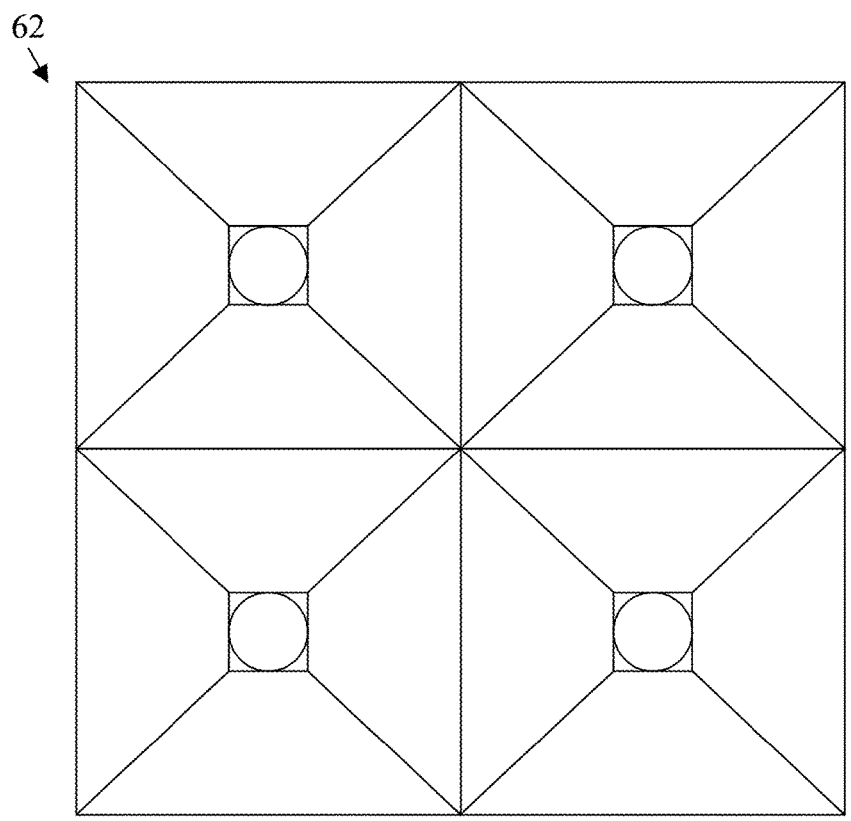
FIG. 5 is an illustration of a rear view of the air register pictured in FIG. 3, in accordance with an embodiment of the present disclosure.
Figure 6:
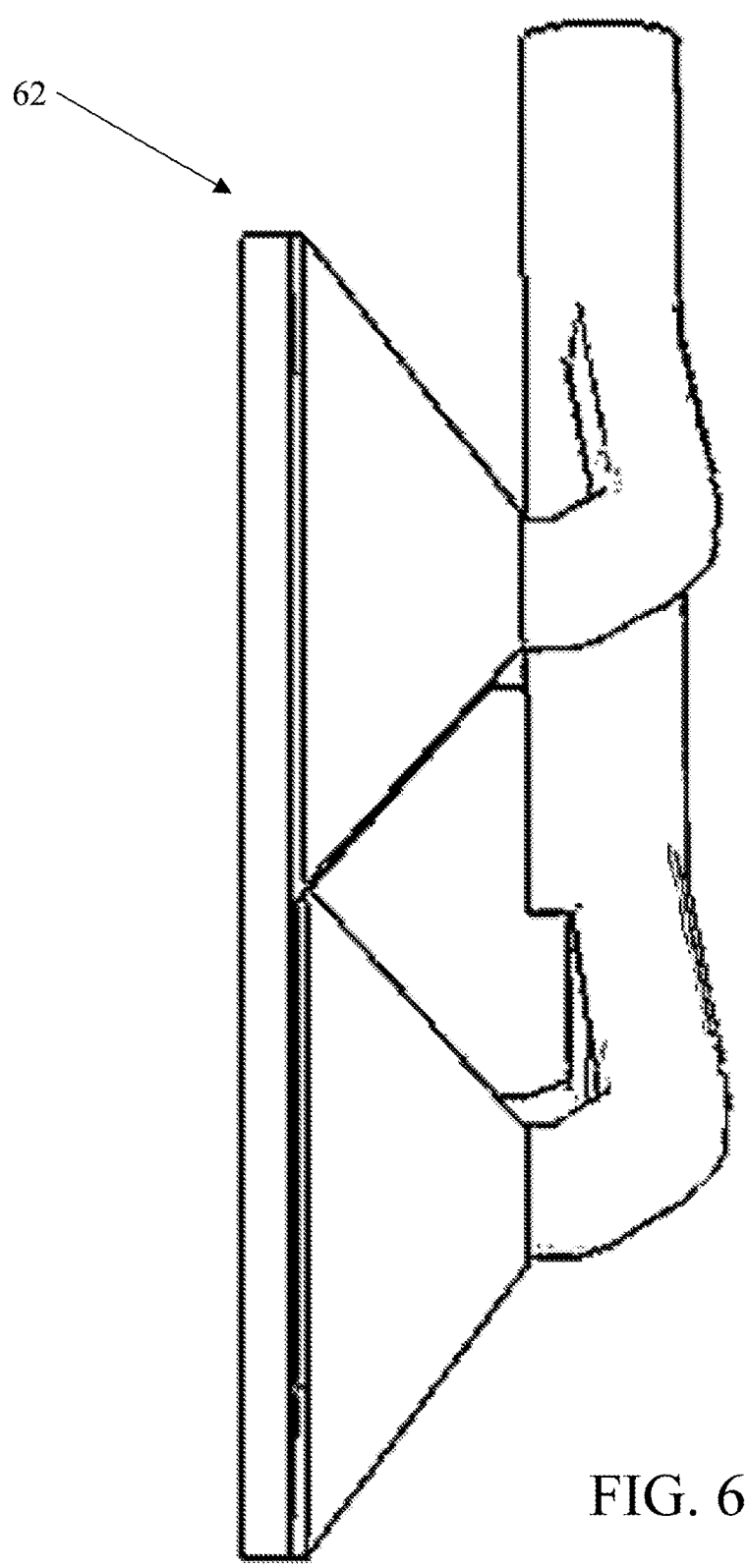
FIG. 6 is an illustration of a side view of the air register pictured in FIG. 3, in accordance with an embodiment of the present disclosure.

Referring to FIG. 3, this picture illustrates a front view of an air register 62, which may be either an exhaust air register 32 or a supply air register 28 of a pair of complementary handling systems, as used in a hydrocarbon or liquefied petroleum gas solvent extraction room ventilation system 20, as shown in FIG. 1. FIG. 4 illustrates a top view of the air register 62 pictured in FIG. 3. FIG. 5 illustrates a rear view of the air register 62 pictured in FIG. 3. FIG. 6 illustrates a side view of the air register 62 pictured in FIG. 3.

Referring to FIG. 1, the system 20 calls for a supply register 28; an example of an air register 28 is pictured in FIG. 3. The supply air register 28 preferably measures approximately 7'×7'; and is made up of a number of panels 64; preferably 11; each panel 64 having one or more slots 66; preferably 2; per panel 64; each slot preferably ⅜" wide and 6' long. Preferably, this creates a total slot discharge area of approximately 4.125 square feet. The volumetric flow supplying the supply registers 28 may be more than 1,000 CFM, and preferably 1,120 CFM. This preferred embodiment would generate a discharge face velocity of 275 fpm at the supply register 28.

Referring back to FIG. 1, the system 20 also calls for an exhaust register 32; an example of an air register 62 is pictured in FIG. 3. The exhaust register 32 also preferably measures approximately 7'×7'; and is made up of a number of panels 64; preferably 11; each panel 64 having one or more slots 66; preferably 2; per panel 64; each slot preferably ¼" wide and 6' long. Preferably, this creates a total slot exhaust area of approximately 2.75 square feet. The volumetric flow supplying the exhaust register 32 in this preferred embodiment being more than 1,000 CFM, and preferably 1,120 CFM. This will generate a face velocity of approximately 436 fpm at the exhaust register 32. The small difference in exhaust verses supply air volume flow rates would create a slightly negative air pressure in the extraction room verses the ante room, which would help to capture and contain any contaminants. The system can create 100% fresh air for makeup and one-pass exhaust with air coming from either the anteroom 34 or an exterior space 70 and flowing through the extraction room 26 and to the exterior space 70.

The preferred embodiment of the ventilation system 20 was engineered to provide a throw distance for the makeup air (supply) of at least 6' with a terminal velocity greater than 50 FPM and a target terminal velocity of 90 FPM. The effective ventilation area would have a footprint of 64 square feet, and an effective volume of 512 cubic feet. Since suction capture distances drop off rapidly with increasing distance, the LPG extraction unit was designed to be placed directly in front of the exhaust register to minimize distance. Given the design exhaust ventilation rate of 1,200 CFM, and an effective volume of 512 cubic feet, the area would have approximately 2.75 air changes per minute, or 165 air changes per hour. This is comparable to many walk-in hood designs. It was the inventor's intent to rapidly push any released gas or vapor towards the exhaust register and thus have it exhausted within minutes.

One pound of butane liquid will generate approximately 6.34 cubic feet of gas. The LEL for butane is 1.6%. If one pound of butane were spilled in a volume of 512 cubic feet (area volume) in a completely static environment, the concentration at equilibrium would be 1.24%, or 77.5% of the LEL. Given that the area's effective ventilation rate is 2.75 air changes per minute, the conservatively calculated percentage of the LEL after one minute would be less than 28%; and less than 10% after 2 minutes. The calculations are conservative since we assumed a well-mixed room, but the extraction equipment should be located directly in front of the exhaust register 9a, and thus the gas generated would be effectively captured prior to dispersing into the room.

Figure 7:
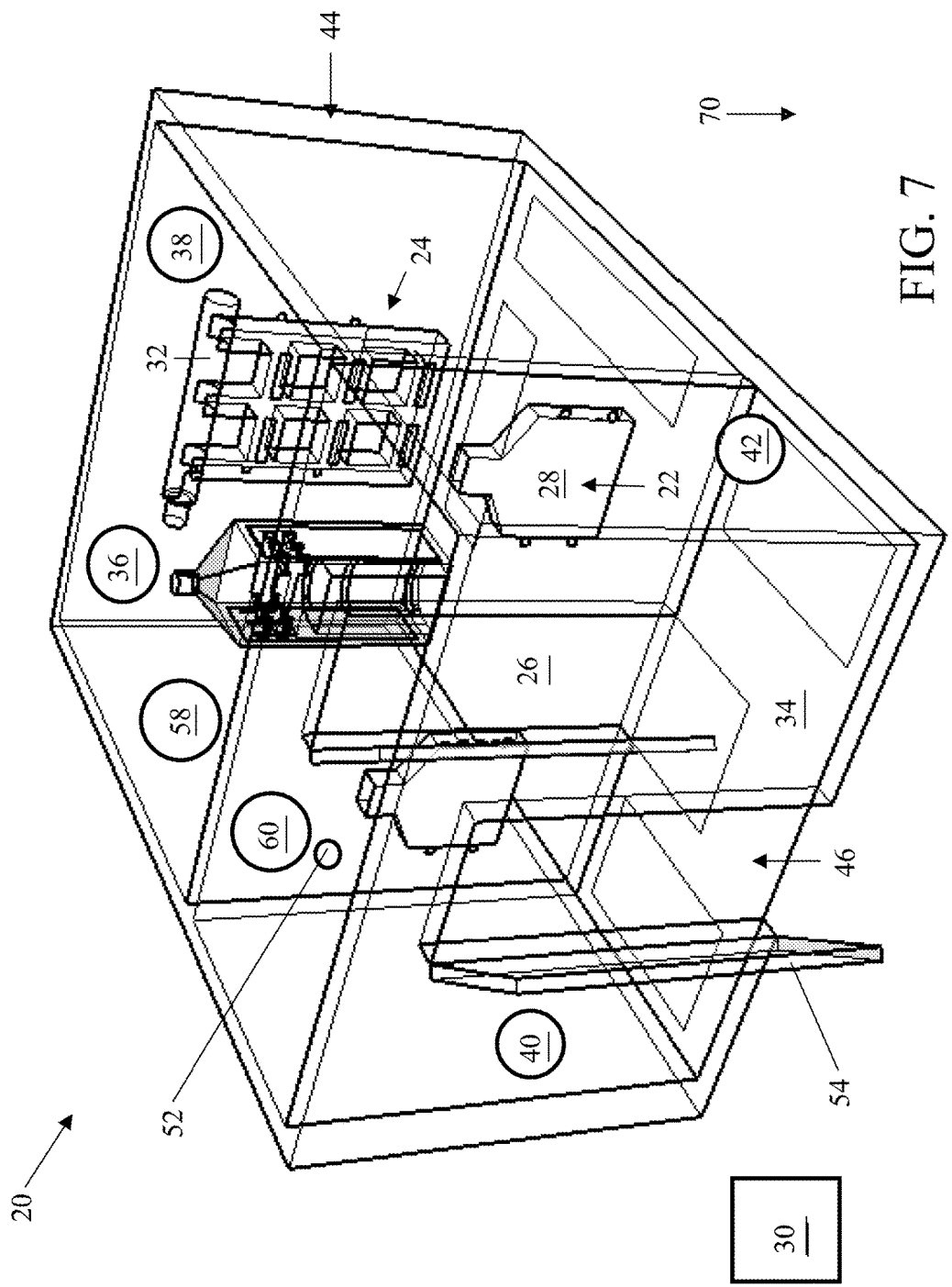
FIG. 7 is an illustration of a perspective view of an extraction room ventilation system, in accordance with an alternative embodiment of the present disclosure.
Figure 8:
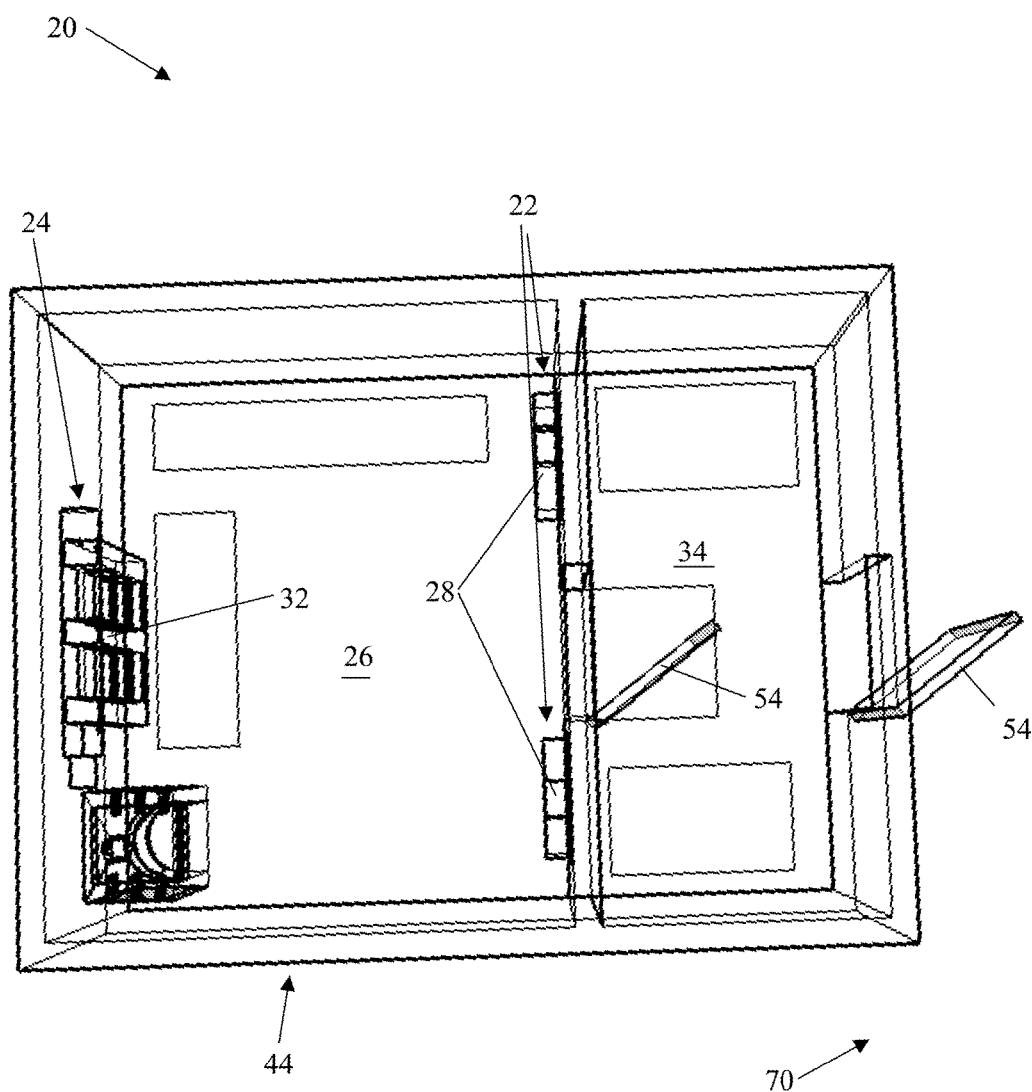
FIG. 8 is an illustration of a top view of an extraction room ventilation system as shown in FIG. 7, in accordance with an alternative embodiment of the present disclosure.

Referring now to FIGS. 7 and 8, these diagrams illustrate a frontal perspective view and a top view of another embodiment of a hydrocarbon or liquefied petroleum gas (LPG) solvent extraction room ventilation system 20, in accordance with an embodiment of the present disclosure. The system 20 comprises a pair of complementary handling systems, the complementary handling systems comprising a supply air system 22 and an exhaust air system 24. The actual size of the ventilated working area between the supply air system 22 and the exhaust air system 24 may be any dimension. The system 20 also comprises an extraction room 26. The supply air system 22 comprises at least one supply air register 28 through which air can pass and a fan, blower, or HVAC system 30 to move the air through the supply air register 28. The exhaust air system 24 comprises at least one exhaust air register 32 through which air can pass and a fan, blower, or HVAC system 30 to move the air through the supply air register 32.

Still referring to FIGS. 7 and 8, the system 20 generally involves an LPG extraction room, a ventilation system, and an electrical system. The configurations are intended to be sufficient to meet the International Fire Code & International Building Code definition for a One Hour Fire Rated Room and all electrical appliances and connections are intended to be configured to meet the National Electric Code (NEC) Class I, Division 1, Group D requirements. Essentially, all vapors and gases are vented from the room; and all possible causes of electrical sparks are reduced to prevent fire or explosion of flammable gases.

Still referring to FIGS. 7 and 8, these diagrams illustrate, a hydrocarbon or liquefied petroleum gas solvent extraction room ventilation system 20, such as a LPG cannabis extraction room, as shown in FIG. 7, in accordance with an embodiment of the present disclosure. The system generally involves a first room, e.g., an extractor room 26, comprising any size; but preferably comprising a width in a range of approximately 10 feet to approximately 14 feet, a length in a range of approximately 8 feet to approximately 14 feet, and a height in a range of approximately 7.5 feet to approximately 10 feet. The system 20 may further involve an anteroom 34, comprising any size; but preferably comprising a width in a range of approximately 5 to 7 feet a length in a range of approximately 10 feet to approximately 14 feet and a height, in a range of approximately 7.5 feet to approximately 10 feet, wherein the anteroom 34 adjoins the extraction room 26.

Still referring to FIGS. 7 and 8, as in FIGS. 1 and 2, the extraction room 26 contains no electrical equipment, except for one or more of the following components: explosion proof lighting 36, a flammable gas detector 38, and other intrinsically safe or Class 1 Division 1, group D electrical appliances. In another embodiment, switches 40 to activate lights and/or the extraction room ventilation system 20 in the extraction room 26 are located outside of the extraction room 26, possibly in the anteroom 34 or on the exterior of the anteroom adjacent to the entrance door. In a preferred embodiment, explosion proof lighting 36 provides approximately 960 to 1,290 lux (lumens per square meter) of light within the extraction room 26. In another embodiment, electrical outlets for small electrically powered equipment 42 may be located within the anteroom 34 on either side of a pathway for ingress and egress. In another embodiment, the walls 44 of the extraction room 26 are smooth and painted with a washable paint or other washable surface. In another embodiment, the floors 46 are sealed with an antestatic epoxy coating or a resilient vinyl laminate material.

In another embodiment, ancillary equipment 48 for supporting the extraction equipment 50 is disposable in the anteroom 34. Ancillary equipment 48 may include, but is not limited to, chillers, sensors, computer systems, security cameras, and other support equipment. Communication between the anteroom 34 and the extraction room 26 could be performed through sealed metal pipes 52 inserted through their connecting wall 44.

Still referring to FIGS. 7 and 8, in a preferred embodiment, in another embodiment, the anteroom 24 may comprises a one-hour IFC/IBC room construction; preferably having an approximately ⅝-inch sheet rock material on metal studs (for fixed location construction) or a unitized construction with walls of an approximately ⅝-inch DensGlass. Preferably, the anteroom 34 also comprises a finish that is a smooth cleanable surface. The anteroom 34 may further comprises a door 54 to the outside for emergency ingress or egress. In a preferred embodiment, the switches for both the anteroom 34 and extraction room 26 are located on the exterior of the anteroom 34, as are major electrical connections and disconnect boxes. The anteroom 34 and extraction room 26 may also comprise a one-hour IFC/IBC room construction; preferably having an approximately ⅝-inch DensGlass on metal studs (for fixed location construction) or unitized construction with walls with an IBC 1 hour construction. In this embodiment, the extraction room 26 and anteroom 34 both comprise an NEC Classification of Class 1, Division I, Group D rating; and both may comprises a finish that is a smooth cleanable surface; and a floor 46 comprising antistatic epoxy coating or resilient vinyl type flooring.

Still referring to FIGS. 7 and 8, in this embodiment, the extraction room 26 preferably experiences approximately 50 to approximately 60 or more air changes per hour. Exhaust from the extraction room 26 may be transmitted via the exhaust air register 32 with a minimum flow rate of more than 1,000 CFM at a static pressure of more than 1 inch of water. If so, the extraction room 26 will be compliant as an NEC classified area, with a rating of Class I, Division 1, Group D. The extraction room 26 may also comprises lighting of Class I Division I and Group D Electrical connections for small intrinsically safe equipment. The ceiling 56 of the extraction room 26 may fitted with a fire suppression system 58 which may be compliant with NFPA 13, IFC & IBC guidance, either a conventional water drench type or a dry exhaust system, for added safety.

Still referring to FIGS. 7 and 8, a determination of weight to be supported by the ceiling 56 is calculated based on the equipment that may be mounted on it. In a preferred embodiment, the following equipment may be included: a HVAC makeup air unit and a 25 to 45 CFM 125 psi air compressor unit. Sufficient load bearing members may be added to the exterior walls of the extraction room 26 and ceiling 56 to support 150% of the calculated load.

Still referring to FIGS. 7 and 8, in another embodiment, a flammable gas detector 38 may be powered whenever flammable gas is present in the extraction room 26, a wire cage may surround the fixed flammable gas detector 38 to protect the fixed flammable gas detector 38 from impact damage. The fixed flammable gas detector 38 maybe continuously operated after the extraction room 26 is commissioned and may be checked and calibrated at intervals of not more than approximately six months to ensure correct operation. The fixed flammable gas detector 38 may comply with NEC Class I, Division 1 requirements. The fixed flammable gas detector 38 may also comprise a display screen that is mounted in the anteroom 34 and provides a reading in percent LEL (lowest concentration capable of starting a fire). The fixed flammable gas detector 38 may be connected to an alarm 60, such as at least one of an audible alarm or a visual alarm, e.g., an alarm light horn and a strobe light, so that, if approximately 25% or greater than the LEL is sensed, the alarm 60 is activated. The fixed flammable gas detector 38 is interconnected with the exhaust air system 24 and/or the supply air system 22 so that, if approximately 25% of the LEL or more is sensed, one or both of the systems are powered or activated into a condition wherein they cannot be depowered. The alarm 60 may be compliant with NEC Class 1, Division I, Group D requirements or exempt.

Still referring to FIGS. 7 and 8, in an embodiment, the switch 40 that actuates the lights for the anteroom 34 and extraction room 26 may also activate one or both of the air supply or exhaust systems. The exhaust fan, blower, or HVAC system 30 may comply with NEC Class 1, Div. I, Group D requirements and have a minimum flow rate of more than 1,000; with preferably 1,200 or more CFM at a static pressure of more than 1 inch water. The air entering the extraction room 26 and the anteroom 34 may be preheated or cooled. The extraction equipment 50 is located as close as possible and directly in front of an exhaust register 32. In one embodiment, the width of the extraction equipment 50 should not exceed approximately 75% of the width of the exhaust register 32; otherwise, the exhaust register 32 is modified (enlarged) for the exact extraction equipment 50. The elevations of the slots 66 in the exhaust air register 32 are preferably located where the capture of potential gas release is the greatest. The points where the potential for gas release is typically the greatest is where spent plant material and extract resin are removed from a receiving cup or a vessel of the extraction equipment 50 and at joints on the extraction equipment 50. In a preferred embodiment, the exhaust register 32 is centered on the wall opposite the extraction room's entry door 54 and the supply air register 28.

In another embodiment, ancillary equipment 48 for supporting the extraction equipment 50 is disposable in the anteroom 34. Ancillary equipment may include, but is not limited to: chillers, sensors, computer systems, security cameras, and other support equipment. In another embodiment, an anteroom 34 comprises a one-hour IFC/IBC room construction, e.g., having an approximately ⅝-inch sheet rock material on metal studs (for fixed location construction) or a unitized construction with walls of an approximately ⅝-inch DensGlass. Preferably, the anteroom 34 comprises a finish that is a smooth cleanable surface. In this embodiment, the extraction room 6 may comprise a minimum size of approximately 10 feet wide by approximately 10 feet long by approximately 7.5 feet high and a maximum size of approximately 14 feet wide by approximately 12 feet long by approximately 10 feet high. The anteroom 34 may further comprise an access door, e.g., the door 54, to the outside for emergency ingress or egress. In a preferred embodiment, the light (or a guard-caged light switch) and support systems switch (not shown) for the anteroom 34 and extraction room 26 are located on the exterior of the anteroom 34.

Still referring to FIGS. 7 and 8, in an embodiment, the switch 40 that actuates the lights for the anteroom 34 and extraction room 26 may also activate one or both of the air supply or exhaust systems. The exhaust fan, blower, or HVAC system 30 may comply with NEC Class 1, Div. I, Group D requirements and have a minimum flow rate of more than 1,080; with preferably 1,200 or more CFM at a static pressure of more than 1 inch water. The air entering the extraction room 26 and the anteroom 34 may be preheated or cooled.

Figure 9:
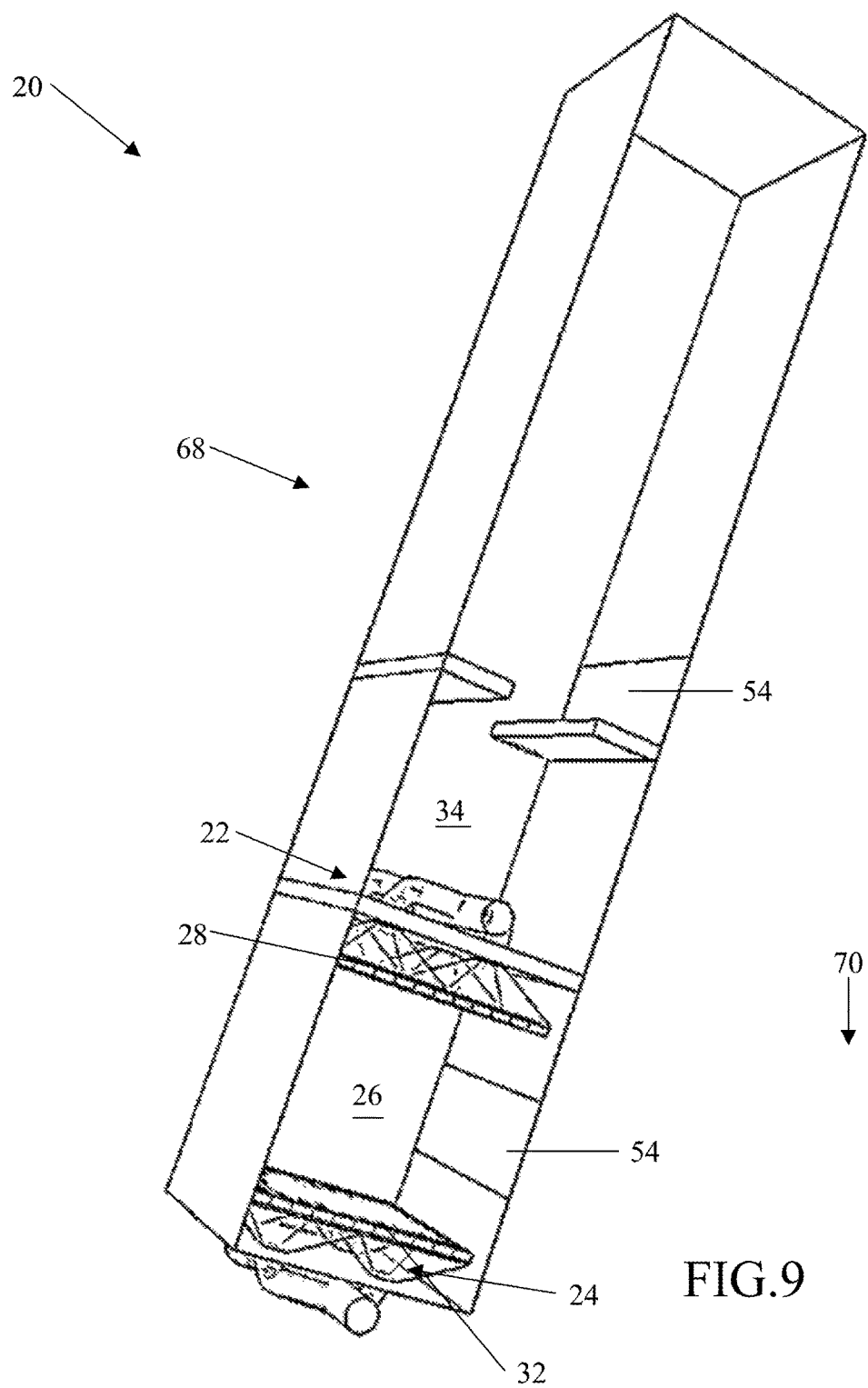
FIG. 9 is an illustration of a perspective view of an extraction room ventilation system built in to a shipping container or semi trailer, in accordance with an alternative embodiment of the present disclosure.

Referring to FIG. 9, this diagram illustrates an extraction room ventilation system 20, such as a butane cannabis extraction room as illustrated in FIGS. 1-2, 7-8, in accordance with another alternative embodiment of the present disclosure. In this embodiment the system 20 may be installed in a standard shipping container, trailer, or semi-trailer 68. Such embodiment of the design would be similar to those described in FIGS. 1-2, 7-8 with the addition of walls 44 and doors 54 being either installed or cut into the container or semi-trailer.

Referring back to FIGS. 1-8, the extraction room ventilation system 20 may be further adaptable for portability and modularity, such as for use in the field, e.g., an agricultural field, with farming equipment, inland freight vehicle, e.g., a tractor-trailer or a train-container, aircraft, watercraft, and the like. The extraction room ventilation system 20 may be made as a prefabricated unit and transported and sold as working functional unit completely in compliance with the International Fire Code & International Building Code definition for a One Hour Fire Rated Room and all electrical appliances and connections are intended to be configured to meet the National Electric Code (NEC) Class I, Division 1, Group D requirements.

Information as herein shown and described in detail is fully capable of attaining the above-described object of the present disclosure, the presently preferred embodiment of the present disclosure; and is, thus, representative of the subject matter; which is broadly contemplated by the present disclosure. The scope of the present disclosure fully encompasses other embodiments, and is to be limited, accordingly, by nothing other than the appended claims, wherein any reference to an element being made in the singular is not intended to mean "one and only one" unless explicitly so stated, but rather "one or more." All structural and functional equivalents to the elements of the above described preferred embodiment and additional embodiments as regarded by those of ordinary skill in the art are also hereby expressly incorporated by reference and are intended to be encompassed by the present claims.

Moreover, no requirement exists for a system or method to address each and every problem sought to be resolved by the present disclosure, for such to be encompassed by the present claims. No element, component, or method step in the present disclosure is intended to be dedicated to the public regardless of whether the element, component, or method step is explicitly recited in the claims. However, that various changes and modifications in form, material, workpiece, and fabrication material detail may be made, without departing from the spirit and scope of the present disclosure, as set forth in the appended claims, as may be apparent to those of ordinary skill in the art, are also encompassed by the present disclosure.

What is claimed:

1. An extraction room and ventilation system, comprising: walls, a floor, a ceiling, and a door; and
a supply air system, the supply air system comprising one of: a fan, or a blower, or an HVAC system and at least one supply air register, said supply register comprised of at least one panel and at least one slot; and
an exhaust air system, the exhaust air system comprising a fan or blower and at least one exhaust air register comprised of at least one panel and at least one slot; and
wherein said supply air system and the exhaust air system are disposed on opposing sides of an extraction room: wherein the supply air system is configured to supply fresh air from an exterior space to said extraction room and said exhaust system purges said fresh air to an exterior space;
wherein said supply air system and the exhaust air system create a negative air pressure in the extraction room versus air pressure outside the room;
wherein said supply air register and exhaust air register each span the entire length and most of the height of opposing walls of said extraction room and together create a laminar type flow of air movement through the extraction room; and
wherein said supply and exhaust air registers each measure 7 feet wide by 7 feet tall or larger and said supply air register has a volumetric flow greater than 1,120 cubic feet per minute, and a discharge face velocity of at least 275 feet per minute at the supply air register; and, said exhaust air register also has a volumetric flow greater than 1,120 cubic feet per minute, and a suction face velocity of at least 346 feet per minute at the exhaust air register; wherein the ventilation system can create 100% fresh air for one-pass exhaust with a throw distance for air supply of at least 6 feet with a terminal velocity greater than 50 feet per minute.

2. The extraction room and ventilation system of claim 1, further comprising an anteroom adjoining said extraction room; wherein said anteroom has a door into said extraction room; and wherein said ventilation system is configured so that the anteroom is positively pressured in respect to the extraction room.

3. The extraction room and ventilation system of claim 1, wherein said supply air register and exhaust air register each span the entire length and most of the height of opposing walls of said extraction room and together create a laminar type flow of air movement.

4. The extraction room and ventilation system of claim 1, wherein the extraction room contains one or more of the following components: explosion proof lighting or a flammable gas detector.

5. The extraction room and ventilation system of claim 4, wherein said flammable gas detector automatically transmits an alarm when 25% of the Lower Explosive Limit (LEL) or lowest concentration of flammable gas capable of initiating ignition is detected.

6. The extraction room and ventilation system of claim 4, wherein said flammable gas detector maintains or automatically starts one or both of said exhaust or supply air systems when 25% of the LEL or of the lowest concentration of flammable gas capable of initiating ignition is detected.

7. The extraction room and ventilation system of claim 1, wherein all electrical appliances and connections are intrinsically safe or National Electric Code (NEC) Class I, Division 1, Group D electrical appliances.

8. The extraction room and ventilation system of claim 1, wherein said system is prefabricated or constructed in place.

9. The extraction room and ventilation system of claim 1, wherein said system is installed in a standard shipping container, trailer, semi-trailer, or other standardized movable unit.

10. The extraction room and ventilation system of claim 1, wherein the extraction room has less than 512 cubic feet and the air changes more than 2.75 times per minute.

11. The extraction room and ventilation system of claim 3, wherein said system is prefabricated.

12. The extraction room and ventilation system of claim 3, wherein said system is installed in a standard shipping container, trailer, semi-trailer, or other standardized movable unit.

13. The extraction room and ventilation system of claim 11, wherein said system is installed in a standard shipping container, trailer, semi-trailer, or other standardized movable unit.

* * * * *